(12) United States Patent
Kosub et al.

(10) Patent No.: US 11,276,401 B2
(45) Date of Patent: Mar. 15, 2022

(54) METHOD FOR A VIRTUAL ASSISTANT, DATA PROCESSING SYSTEM HOSTING A VIRTUAL ASSISTANT FOR A USER AND AGENT DEVICE FOR ENABLING A USER TO INTERACT WITH A VIRTUAL ASSISTANT

(71) Applicant: Infineon Technologies AG, Neubiberg (DE)

(72) Inventors: Johann Kosub, Neutraubling (DE); Roman Peters, Hainsacker-Lappersdorf (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 244 days.

(21) Appl. No.: 16/561,618

(22) Filed: Sep. 5, 2019

(65) Prior Publication Data

US 2020/0082821 A1 Mar. 12, 2020

(30) Foreign Application Priority Data

Sep. 6, 2018 (EP) .................................... 18193044

(51) Int. Cl.
*G10L 15/22* (2006.01)
*G01S 13/04* (2006.01)
*G01S 13/06* (2006.01)

(52) U.S. Cl.
CPC .............. *G10L 15/22* (2013.01); *G01S 13/04* (2013.01); *G01S 13/06* (2013.01); *G06F 2203/0381* (2013.01); *G10L 2015/223* (2013.01); *G10L 2015/227* (2013.01)

(58) Field of Classification Search
CPC ......... G10L 15/22; G10L 15/00; G10L 15/06; G10L 15/063; G10L 15/065; G10L 15/07; G10L 15/08; G10L 15/183; G10L 15/20; G10L 15/24; G10L 15/26; G10L 15/30; G10L 2015/22; G10L 2015/00; G10L 2015/06; G10L 2015/063; G10L 2015/0638; G10L 2015/08; G10L 2015/223; G10L 2015/225; G10L 2015/226; G10L 2015/228; G10L 2015/0631–0638; G10L 2015/221–228
USPC .............................. 704/270.1, 270, 274, 275
See application file for complete search history.

(56) References Cited

U.S. PATENT DOCUMENTS 10,042,995 B1 * 8/2018 Strand .................... G06F 21/32
2017/0299394 A1 * 10/2017 Lee ..................... G06K 9/00671
2018/0018965 A1   1/2018 Daley
2018/0232902 A1   8/2018 Albadawi et al.
(Continued)

*Primary Examiner* — Qi Han
(74) *Attorney, Agent, or Firm* — Slater Matsil, LLP

(57) ABSTRACT

A method for a virtual assistant is provided. The method includes controlling, in a first operation mode, at least one sensor to sense a physical quantity. Further, the method includes receiving, in the first operation mode, sensor data indicative of the physical quantity from the at least one sensor. Additionally, the method includes processing, in the first operation mode, the sensor data to detect whether the sensor data exhibit a predetermined characteristic. If the predetermined characteristic is detected in the sensor data, the method includes setting the operation mode of the virtual assistant to a second operation mode assigned to the predetermined characteristic.

17 Claims, 2 Drawing Sheets

(56) References Cited

U.S. PATENT DOCUMENTS

2018/0253954 A1* 9/2018 Verma .................... G06F 3/017
2020/0265835 A1* 8/2020 Ni ......................... G06N 3/006

* cited by examiner

METHOD FOR A VIRTUAL ASSISTANT, DATA PROCESSING SYSTEM HOSTING A VIRTUAL ASSISTANT FOR A USER AND AGENT DEVICE FOR ENABLING A USER TO INTERACT WITH A VIRTUAL ASSISTANT

This application claims the benefit of European Application No. 18193044, filed on Sep. 6, 2018, which application is hereby incorporated herein by reference.

TECHNICAL FIELD

Examples relate to virtual assistants for users. In particular, examples relate to a method for a virtual assistant, a data processing system hosting a virtual assistant for a user and an agent device for enabling a user to interact with a virtual assistant.

BACKGROUND

Voice controlled digital/virtual assistants are becoming more and more popular. However, these assistants are vulnerable to undesired manipulations by, e.g., third persons, children or audio files. In order to prevent these undesired manipulations of the virtual assistants, authentication, verification and pre-detection of human users may be used. At the same time, the privacy of the users is to be ensured so that full monitoring with cameras and/or voice recognition is commonly not an option.

Hence, there may be a demand for improved pre-detection of human presence.

SUMMARY

An example relates to a method for a virtual assistant. The method comprises controlling, in a first operation mode, at least one sensor to sense a physical quantity. Further, the method comprises receiving, in the first operation mode, sensor data indicative of the physical quantity from the at least one sensor. Additionally, the method comprises processing, in the first operation mode, the sensor data to detect whether the sensor data exhibit a predetermined characteristic. If the predetermined characteristic is detected in the sensor data, the method comprises setting the operation mode of the virtual assistant to a second operation mode assigned to the predetermined characteristic.

A further example relates to a non-transitory machine readable medium having stored thereon a program having a program code for performing the method described herein, when the program is executed on a processor.

Another example relates to a data processing system hosting a virtual assistant for a user. The data processing system comprises one or more processors configured to control, in a first operation mode, at least one sensor to sense a physical quantity. Further, the one or more processors are configured to receive, in the first operation mode, sensor data indicative of the physical quantity from the at least one sensor. Additionally, the one or more processors are configured to process, in the first operation mode, the sensor data to detect whether the sensor data exhibit a predetermined characteristic. If the predetermined characteristic is detected in the sensor data, the one or more processors are configured to set the operation mode of the virtual assistant to a second operation mode assigned to the predetermined characteristic.

An example additionally relates to an agent device for enabling a user to interact with a virtual assistant. The agent device comprises at least one microphone configured to receive a voice command for the virtual assistant from the user, and at least one loudspeaker configured to output sound data provided by the virtual assistant to the user. Further, the agent device comprises a network interface configured to exchange data between the agent device and a data processing system hosting the virtual assistant. The agent device additionally comprises one or more of: at least one pressure sensor configured to sense an air pressure in the environment of the agent device; at least one radar sensor configured to sense presence or movement of the user in the environment of the agent device; a first sensor interface configured to couple to at least one external pressure sensor sensing an air pressure in an area of interest; and a second sensor interface configured to couple to at least one external radar sensor sensing presence or movement of the user in the area of interest.

A still further example relates to an apparatus for a virtual assistant. The apparatus comprises means for controlling, in a first operation mode, at least one sensor to sense a physical quantity. Further, the apparatus comprises means for receiving, in the first operation mode, sensor data indicative of the physical quantity from the at least one sensor. Additionally, the apparatus comprises means for processing, in the first operation mode, the sensor data to detect whether the sensor data exhibit a predetermined characteristic. The apparatus further comprises means for setting the operation mode of the virtual assistant to a second operation mode assigned to the predetermined characteristic if the predetermined characteristic is detected in the sensor data.

BRIEF DESCRIPTION OF THE DRAWINGS

Some examples of apparatuses and/or methods will be described in the following by way of example only, and with reference to the accompanying figures, in which.

DETAILED DESCRIPTION OF ILLUSTRATIVE EMBODIMENTS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
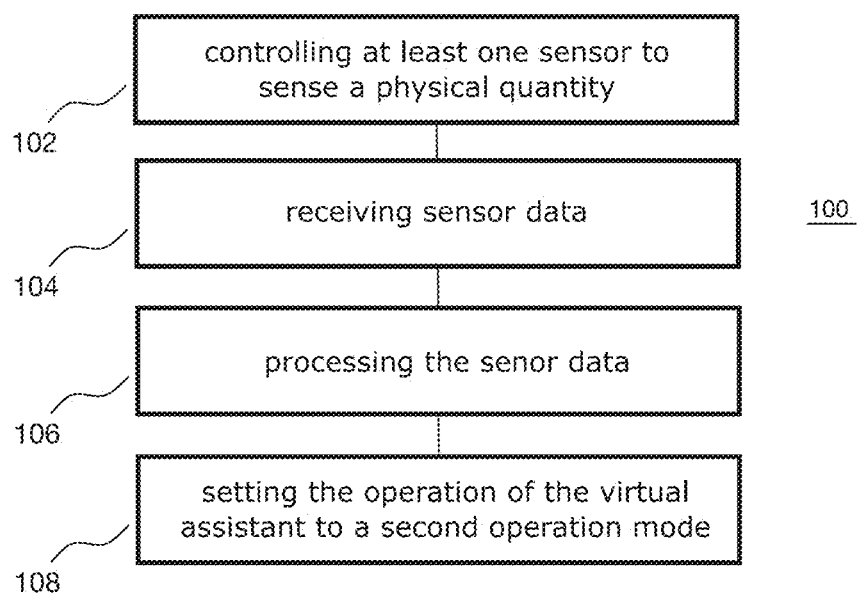
FIG. 1 illustrates a flowchart of an example of a method for a virtual assistant.

FIG. 1 illustrates a method 100 for a virtual assistant. A virtual assistant is a computer-implemented agent that can perform tasks or services for an individual. The virtual assistant is for instance software in nature, at least in part. It may also comprise hardware components. For example, a virtual assistant may provide information such as weather or facts, set an alarm, make to-do lists or shopping lists, play music or videos from streaming services, or buy items on online sales platforms. The virtual assistant is hosted on a data processing system. For example, the data processing system may comprise one or more processors executing dedicated software for hosting the virtual assistant. A user may interact with the virtual assistant via an agent device. For example, the user may interact with the virtual assistant via voice, gestures and/or text. The agent device may be implemented as various types of physical platforms such as a smart speaker, a mobile phone (e.g. a smartphone), a tablet-computer, a laptop, or a vehicle. That is, the agent device serves as a user interface enabling the user to interact with the virtual assistant. It should be noted that the virtual assistant may be hosted by the agent device itself, either in part or entirely. Alternatively, the virtual assistant is hosted in a location other than the agent device.

The method 100 comprises controlling 102, in a first operation mode, at least one sensor to sense a physical quantity, i.e. a physical phenomenon. The at least one sensor may be arranged at a variety of locations. For example, the at least one sensor may be arranged in the physical agent device. Alternatively, the at least one sensor may be arranged external of the physical agent device in an area of interest. The physical agent device may, e.g., comprise a network interface for coupling to an external sensor. The physical quantity may be any quantity that allows characterization of an area of interest. For example, the physical quantity may be an air pressure in the environment of the agent device, or an air pressure in an area of interest. In other words, the at least one sensor may be a pressure sensor (e.g. implemented as Micro Electro Mechanical System, MEMS, sensor). In other examples, the at least one sensor may be a radar sensor. Accordingly, the physical quantity may be (reflected) electromagnetic waves received by the radar sensor. In some examples, the at least one sensor may be different from a microphone of the physical agent device for receiving voice commands of the user.

In the first operation mode, the method 100 further comprises receiving 104 sensor data indicative of the physical quantity from the at least one sensor. For example, the data processing system hosting the virtual assistant may receive the sensor data from the physical agent device via a network (e.g. the internet). By sensing the environment using the at least one sensor, data about the environment or changes in the environment may be collected in the first operation mode.

Additionally, the method 100 comprises in the first operation mode processing 106 the sensor data to detect whether the sensor data exhibit a predetermined characteristic. The predetermined characteristic is a "fingerprint" in the sensor data that is characteristic for a certain state or change in the sensed area. The predetermined characteristic may, e.g., be a characteristic absolute air pressure, a characteristic air pressure change (variation) or a characteristic pattern of received electromagnetic waves. For example, the predetermined characteristic may indicate presence of a human being, a specific location of the at least one sensor and/or the agent device, an opening of a door, etc. The sensor data may, e.g., be scanned for the predetermined characteristic.

In some examples, the predetermined characteristic may be based on one or more reference measurements using the at least one sensor. In other words, the virtual assistant may be calibrated for the predetermined characteristic. For example, human breathing of a user may be measured in order to determine a characteristic air pressure change that allows determination of human presence. Also, pressure changes caused by closing or opening a door or window in a room may be measured for determining a characteristic air pressure change that allows determining human presence (absence). In some examples, an absolute air pressure may be measured to determine a characteristic air pressure for specific positions of the physical agent device (e.g. on the ground/floor or on a desk).

If the predetermined characteristic is detected in the sensor data, the method 100 comprises setting 108 the operation mode of the virtual assistant to a second operation mode assigned to the predetermined characteristic. The second operation mode is different from the first operation mode. Changing the operation mode upon detection of the predetermined characteristic may allow adjusting the functionality and/or behavior of the virtual assistant to the given circumstances.

Similarly, the operation mode of the virtual assistant may be changed to other modes of operation if other predetermined characteristics are detected in the sensor data. For example, the method 100 may in the first operation mode further comprise processing the sensor data to detect whether the sensor data exhibit another predetermined characteristic. If the other predetermined characteristic is detected in the sensor data, the method 100 comprises setting the operation mode of the virtual assistant to a third operation mode assigned to the other predetermined characteristic. The third operation mode is different from the second operation mode.

The first operation mode may, e.g., be a hub mode or a standby mode of the virtual assistant. However, it is to be noted that the first operation mode may in general be any operation mode supported by the virtual assistant.

As indicated above, the predetermined characteristic may indicate human breathing. Detecting human breath may allow avoiding manipulation of the virtual assistant by means of audio files or any third party acoustic sources. If a human user is speaking in an area around the at least one sensor (e.g. within a distance of about 1 meter), detectable air pressure variations are generated by the human user. Accordingly, the detection of human breath may allow detecting a real person interacting with the virtual assistant. Accordingly, the virtual assistant may be configured to process a voice command of the user in the second operation mode.

On the other hand, if the voice command is received but the predetermined characteristic for human breathing is not detected in the sensor data, the virtual assistant may be configured to not process the voice command. For example, the virtual assistant may remain in the first operation mode. In some examples, not detecting human breathing while receiving a voice command may further trigger the virtual assistant to start an alarm routine (e.g. send a notification, play an alarm sound, etc.).

Detecting the presence of human breathing may, e.g., increase the safety if sensitive user commands are received. For example, if the user command indicates to start or execute a fee-based procedure (e.g. starting a video stream or buying an item via an online platform), detection of human breathing may allow avoiding exploitation of a user's account by third parties via manipulated audio files.

In some examples, the virtual assistant may be configured to determine in the second operation mode whether the voice command is given within a predetermined range around the physical agent device. For example, the virtual device may analyze a volume of the voice command and compared it to recorded environment volume levels or reference volume levels of the user. The virtual assistant may be further configured to only process the voice command in the second operation mode if the voice command is given within the predetermined range. Accordingly, the virtual assistant may only process voice commands actually issued by the user in the proximity of the physical agent device.

As said above, the sensor data may be used to determine a position (location) of the agent device. For example, the predetermined characteristic may indicate positioning of the agent device below a predetermined height (e.g. 0.5 or 1 meter) with respect to the ground (floor). The predetermined characteristic may, e.g., indicate positioning of the physical agent device on the ground (floor). If the agent device is positioned on the ground (floor) a child may try to interact with the agent device or the agent device may output sound in the immediate vicinity of the child. Therefore, the second operation mode may be a child mode with limited functionality and/or a dedicated sound profile compared to a fully operational mode of the virtual assistant. For example, if the sensor data indicates that the physical agent device is located on the ground, the virtual assistant may be set to the child mode and accept only selected or no voice commands. Alternatively or additionally, a child-friendly sound profile may be used (e.g. reduced volume or reduced bass for sound output by the agent device). Similarly, the method 100 may change the operation mode of the virtual assistant to another operation mode if a further predetermined characteristic is detected in the sensor data that indicates positioning of the agent device above another predetermined height (e.g. 0.8 meter).

In other examples, the predetermined characteristic may, e.g., indicate opening or closing of a door in the environment of the agent device or in the area of interest monitored by the at least one sensor. The opening of a door may be an indicator for a user entering a room in which the agent device is located. Similarly, the closing of a door may be an indicator for a user leaving a room in which the agent device is located. For example, the at least one sensor may be located in the proximity of an entrance door of a house or a flat so that upon detection of entrance door opening the operation mode of the virtual assistant is changed from a standby mode to a welcome mode (e.g. the virtual assistant may control lights within the house/flat to turn on, start outputting sound via one or more loudspeakers, etc.).

The opening of a door may further indicate a third person entering a room in which the agent device is located. For protecting the privacy of user data managed by the virtual assistant or for preventing manipulation of the virtual assistant by the third person, the virtual assistant may be changed to a guest mode upon detection of door opening. The level of authorization may be understood as a quantity that determines the functionalities of the virtual assistant, data etc. a person can use or access. Different levels of authorization may allow to access different types of functionalities and data.

The closing of a door may be used for detecting the user left the house or flat. Accordingly, the second operation mode may be an alarm mode of the virtual assistant in which one or more secure functionalities are activated (e.g. one or more sensors for surveying the house/flat are activated and their sensor data is analyzed).

In other words, upon detection of opening or closing of a door many different features may be activated in the second mode. For example, a sound profile for outputting sound to the user may be different in the second operation mode compared to the first operation mode, a functional scope or an authorization level of the virtual assistant may be different in the second operation mode compared to the first operation mode, or the second operation mode may be an alarm mode. However, it is to be noted that the above examples are exemplary and that the second operation mode many exhibit many other features (and, e.g., omit some or all of the above features).

In other words, monitoring the air pressure, e.g., in the near and far sound field of a smart speaker may allow smart applications for the virtual assistant. Exemplary second operation modes may comprise: an alarm mode when a user leaves the house. In this way not only guests but also intruders could be detected. A babysitter (child) mode switching to a customized parental setup may be used when a changed height position is detected. A privacy/night mode in which only commands nearby (e.g. less than 1 meter) the speaker will be accepted.

Similarly, monitoring the air pressure may enable smart sound control. Exemplary second operation modes may comprise/exhibit: a lower maximum sound volume when changed position detected (e.g. due to children safety). An adaptation of the sound volume to the human voice volume (e.g. for a very near speaking distance of the user). Sound output only via a loudspeaker next to the signal source (e.g. when door opening is detected).

As described above, the at least one sensor may also be radar sensor so that the sensed physical quantity is electromagnetic waves received by the radar sensor. For user pre-determination, the predetermined characteristic may indicate presence (e.g. without movement) or movement of the user. For example, presence of the user without movement may be determined based on micro-Dopplers induced in the electromagnetic waves by the user. The predetermined characteristic may, e.g., be a receive pattern for electromagnetic waves that is learned from previous reference (calibration) measurements.

In some examples, pressure sensors and radar sensors may be used together. For example, a module consisting of an integrated circuit with a highly sensitive air pressure sensor and radar sensor in a MEMS design may be used. The sensor combination and the mutual feedback of the sensors during signal processing may enable monitoring the important changes in a house or flat.

The above sensors may share different tasks. For example, the air pressure sensor may measure its own height position and actively search for air pressure waves as they typically occur and spread throughout the house when, e.g., doors or windows are opened. If this situation occurs, the radar sensor is switched to active mode and permanently scans the environment for moving bodies. If this sensor is also triggered, the signal is sent to the (e.g. voice-controlled) virtual assistant so that the virtual assistant may start with identifying the person or give an alarm. However, the voice-controlled assistant can also become active as soon as the air pressure sensor is triggered and become noticeable, for example, by playing music, which would serve equally to greet the occupants of the house and deter any intruders.

The access confirmation by the radar sensor may further allow the air pressure sensor to be automatically calibrated to the correct sensitivity, especially at the beginning of normal passenger traffic. Future false signals may effectively be prevented. Furthermore, depending on the sequence of the signals, it is possible to distinguish between entering and leaving a room and to react accordingly. Regardless of the access monitoring options, the virtual assistant may be trained in this manner to switch to eavesdropping mode only in the presence of persons. Additionally, the purely linguistic authentication of persons may be made more secure to the extent that the freely selectable location of the operator can also be programmed with the help of the radar sensor and adjusted each time. The pressure sensor may serve as a motion sensor if the sensor's own location is changed.

With virtual assistants becoming more power to rule a user's daily life, authentication, verification and pre-detection of human users in terms of privacy and according user (authorization) levels is becoming more and more important. The proposed concept may allow safe pre-detection of human presence without requiring full monitoring.

In the second operation mode, the virtual assistant may in some examples be configured to provide information about the detection of the predetermined characteristic to a third-party application via an Application Programming Interface (API). Like apps on the smart phone there are third-party applications (also known as "skills") inside a digital assistant. Skills are customized digital applications enabling special services that may take advantage of the sensor data. For example when used in a hotel, the following exemplary uses cases may benefit from the sensor data: when it is detected that somebody is opening the room door, the skill may ask about the planned room service. The own floor position may be detected for better hotel guide skills. Booking of hotel services with costs may only be accepted after a final "OK" spoken directly over the speaker (and detected by the air pressure sensor via the human breathing).

In other words, business applications may benefit from the proposed concept.

Figure 2:
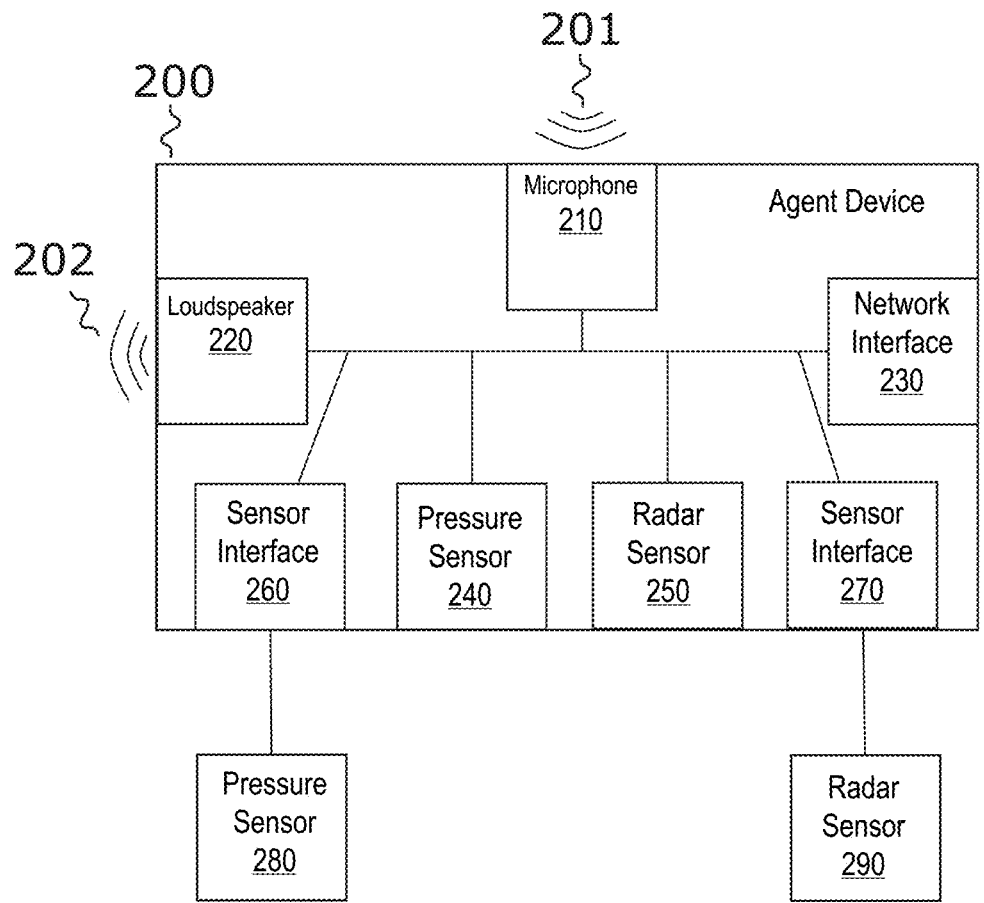
FIG. 2 illustrates an example of an agent device for enabling a user to interact with a virtual assistant.

An exemplary agent device 200 for enabling a user to interact with a virtual assistant as proposed herein is illustrated in FIG. 2. The agent device 200 may, e.g., be a smart speaker or a mobile phone. The agent device 200 comprises at least one microphone 210 configured to receive a voice command 201 for the virtual assistant from the user. Further, the agent device 200 comprises at least one loudspeaker 220 configured to output sound data 202 provided by the virtual assistant to the user. For coupling the agent device 200 to the virtual assistant, the agent device 200 comprises a network interface 230 configured to exchange data between the agent device 200 and a data processing system hosting the virtual assistant.

For monitoring the environment according to the proposed concept, the agent device 200 may comprise at least one pressure sensor 240 configured to sense an air pressure in the environment of the agent device 200. Alternatively or additionally, the agent device 200 may comprise at least one radar sensor 250 configured to sense presence (e.g. without movement) or movement of the user in the environment of the agent device 200. That is, the agent device may comprise one or more built-in sensors for monitoring the environment of the agent device 200.

For example, for determining a height position of the agent device with high accuracy, the agent device may comprise two air pressure sensors—one with high absolute accuracy and one with high relative accuracy. For monitoring the near field of the agent device with high resolution, the agent device may, e.g., comprise one air pressure sensor at the top and a second air pressure sensor at the bottom for reference. If a direction of a sound source is to be determined, several air pressure sensors with 1000 or more readouts per second may arranged within the agent device. Additionally, the air pressure measurement may be combined with further sensor measurements (e.g. a magnetic sensor). In some examples, the air pressure sensor may further coupled with the alignment of the microphone 210.

The agent device 200 may further or alternatively comprise one or more sensor interfaces for coupling to external sensors for monitoring an area of interest. The sensor interfaces may be wired interfaces or wireless interfaces. For example, the agent device 200 may comprise a first sensor interface 260 configured to couple to at least one external pressure sensor 280 sensing an air pressure in an area of interest (e.g. near an entrance door). Similarly, the agent device 200 may comprise a second sensor interface 270 configured to couple to at least one external radar sensor 290 sensing presence (e.g. without movement) or movement of the user in the area of interest (e.g. near an entrance door).

The sensor data is processed by the virtual assistant for determining predetermined characteristics indicative of situations of interest. Therefore, the network interface 230 is configured to transmit data on the air pressure and/or the presence (e.g. without movement) or movement of the user to the data processing system hosting the virtual assistant.

Further, the control data for controlling the agent device 200 is provided by the virtual assistant. For example, the network interface 230 may be configured to receive control data indicative of a change of operation mode of the virtual assistant from the data processing system hosting the virtual assistant. The control data may, e.g., be based on the data on the air pressure and/or the presence or movement of the user previously collected by the agent device 200.

The examples as described herein may be summarized as follows:

Some examples relate to a method for a virtual assistant. The method comprises controlling, in a first operation mode, at least one sensor to sense a physical quantity. Further, the method comprises receiving, in the first operation mode, sensor data indicative of the physical quantity from the at least one sensor. Additionally, the method comprises processing, in the first operation mode, the sensor data to detect whether the sensor data exhibit a predetermined characteristic. If the predetermined characteristic is detected in the sensor data, the method comprises setting the operation mode of the virtual assistant to a second operation mode assigned to the predetermined characteristic.

In some examples, the method further comprises processing, in the first operation mode, the sensor data to detect whether the sensor data exhibit another predetermined characteristic. If the other predetermined characteristic is detected in the sensor data, the method additionally comprises setting the operation mode of the virtual assistant to a third operation mode assigned to the other predetermined characteristic. The third operation mode is different from the second operation mode.

In some examples, the predetermined characteristic is based on one or more reference measurements using the at least one sensor.

In the second operation mode, the virtual assistant is according to some examples configured to provide information about the detection of the predetermined characteristic to a third-party application via an application programming interface.

The at least one sensor is in some examples arranged in a physical agent device for enabling a user to interact with the virtual assistant, and the physical quantity is an air pressure in the environment of the agent device. Alternatively, the at least one sensor may be arranged in an area of interest and external of the physical agent device, and the physical quantity may be an air pressure in the area of interest.

According to some examples, the predetermined characteristic indicates human breathing, wherein the virtual assistant is configured to process a voice command of the user in the second operation mode.

If the voice command is received and the predetermined characteristic is not detected in the sensor data, the virtual assistant is in some examples configured to not process the voice command.

In some examples, the virtual assistant is configured to determine in the second operation mode whether the voice command is given within a predetermined range around the physical agent device. Further, the virtual assistant is configured to only process the voice command in the second operation mode if the voice command is given within the predetermined range.

According to some examples, the predetermined characteristic indicates positioning of the agent device below a predetermined height with respect to the ground, and the second operation mode is a child mode with limited functionality and/or a dedicated sound profile compared to a fully operational mode of the virtual assistant.

In some examples, the predetermined characteristic indicates opening or closing of a door in the environment of the agent device or in the area of interest.

A sound profile for outputting sound to the user is different in the second operation mode compared to the first operation mode according to some examples. Additionally or alternatively, a functional scope or an authorization level of the virtual assistant may be different in the second operation mode compared to the first operation mode. Further additionally or alternatively, the second operation mode may be an alarm mode.

In some examples, the at least one sensor is a radar sensor, wherein the physical quantity is electromagnetic waves received by the radar sensor, and wherein the predetermined characteristic indicates presence or movement of the user.

Further examples relate to a non-transitory machine readable medium having stored thereon a program having a program code for performing the method described herein, when the program is executed on a processor.

Further examples relate to a data processing system hosting a virtual assistant for a user. The data processing system comprises one or more processors configured to control, in a first operation mode, at least one sensor to sense a physical quantity. Further, the one or more processors are configured to receive, in the first operation mode, sensor data indicative of the physical quantity from the at least one sensor. Additionally, the one or more processors are configured to process, in the first operation mode, the sensor data to detect whether the sensor data exhibit a predetermined characteristic. If the predetermined characteristic is detected in the sensor data, the one or more processors are configured to set the operation mode of the virtual assistant to a second operation mode assigned to the predetermined characteristic.

Examples additionally relate to an agent device for enabling a user to interact with a virtual assistant. The agent device comprises at least one microphone configured to receive a voice command for the virtual assistant from the user, and at least one loudspeaker configured to output sound data provided by the virtual assistant to the user. Further the agent device comprises a network interface configured to exchange data between the agent device and a data processing system hosting the virtual assistant. The agent device additionally comprises one or more of: at least one pressure sensor configured to sense an air pressure in the environment of the agent device; at least one radar sensor configured to sense presence or movement of the user in the environment of the agent device; a first sensor interface configured to couple to at least one external pressure sensor sensing an air pressure in an area of interest; and a second sensor interface configured to couple to at least one external radar sensor sensing presence or movement of the user in the area of interest.

In some examples, the network interface is configured to transmit data on the air pressure and/or the presence or movement of the user to the data processing system. Further, the network interface is configured to receive control data indicative of a change of operation mode of the virtual assistant from the data processing system, wherein the control data is based on the data on the air pressure and/or the presence or movement of the user.

Still further examples relate to an apparatus for a virtual assistant. The apparatus comprises means for controlling, in a first operation mode, at least one sensor to sense a physical quantity. Further, the apparatus comprises means for receiving, in the first operation mode, sensor data indicative of the physical quantity from the at least one sensor. Additionally, the apparatus comprises means for processing, in the first operation mode, the sensor data to detect whether the sensor data exhibit a predetermined characteristic. The apparatus further comprises means for setting the operation mode of the virtual assistant to a second operation mode assigned to the predetermined characteristic if the predetermined characteristic is detected in the sensor data.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for a virtual assistant, comprising:
   controlling, in a first operation mode, at least one sensor to sense a physical quantity;
   receiving, in the first operation mode, sensor data indicative of the physical quantity from the at least one sensor;
   processing, in the first operation mode, the sensor data to detect whether the sensor data exhibit a first predetermined characteristic; and
   if the first predetermined characteristic is detected in the sensor data, setting the operation mode of the virtual assistant to a second operation mode assigned to the first predetermined characteristic, wherein
      the at least one sensor is arranged in a physical agent device for enabling a user to interact with the virtual assistant, and the physical quantity is an air pressure in an environment of the agent device, and
      the first predetermined characteristic indicates positioning of the agent device below a predetermined height with respect to the ground, and wherein the second operation mode is a child mode with limited functionality and/or a dedicated sound profile compared to a fully operational mode of the virtual assistant.

2. The method of claim 1, further comprising:
   processing, in the first operation mode, the sensor data to detect whether the sensor data exhibit a second predetermined characteristic; and
   if the second predetermined characteristic is detected in the sensor data, setting the operation mode of the virtual assistant to a third operation mode assigned to the second predetermined characteristic, wherein the third operation mode is different from the second operation mode.

3. The method of claim 1, wherein the first predetermined characteristic is based on one or more reference measurements using the at least one sensor.

4. The method of claim 1, wherein the first predetermined characteristic indicates human breathing, and wherein the virtual assistant is configured to process a voice command of the user in the second operation mode.

5. The method of claim 4, wherein, if the voice command is received and the first predetermined characteristic is not detected in the sensor data, the virtual assistant is configured to not process the voice command.

6. The method of claim 1, wherein the first predetermined characteristic indicates opening or closing of a door in the environment of the agent device or in an area of interest.

7. The method of claim 6, wherein:
   a sound profile for outputting sound to the user is different in the second operation mode compared to the first operation mode;
   a functional scope or an authorization level of the virtual assistant is different in the second operation mode compared to the first operation mode; or
   the second operation mode is an alarm mode.

8. The method of claim 1, wherein the at least one sensor is a radar sensor, wherein the physical quantity is electromagnetic waves received by the radar sensor, and wherein the first predetermined characteristic indicates presence or movement of the user.

9. The method of claim 1, wherein, in the second operation mode, the virtual assistant is configured to provide information about the detection of the first predetermined characteristic to a third-party application via an application programming interface.

10. A non-transitory machine readable medium having stored thereon a program having a program code for performing the method of claim 1, when the program is executed on a processor.

11. A data processing system hosting a virtual assistant for a user, wherein the data processing system comprises one or more processors configured to:
   control, in a first operation mode, at least one sensor to sense a physical quantity;
   receive, in the first operation mode, sensor data indicative of the physical quantity from the at least one sensor;
   process, in the first operation mode, the sensor data to detect whether the sensor data exhibit a predetermined characteristic; and
   if the predetermined characteristic is detected in the sensor data, set the operation mode of the virtual assistant to a second operation mode assigned to the predetermined characteristic, wherein
      the at least one sensor is arranged in a physical agent device for enabling the user to interact with the virtual assistant, and the physical quantity is an air pressure in an environment of the agent device, and
      the first predetermined characteristic indicates positioning of the agent device below a predetermined height with respect to the ground, and wherein the second operation mode is a child mode with limited functionality and/or a dedicated sound profile compared to a fully operational mode of the virtual assistant.

12. An agent device for enabling a user to interact with a virtual assistant, comprising:
- at least one microphone configured to receive a voice command for the virtual assistant from the user;
- at least one loudspeaker configured to output sound data provided by the virtual assistant to the user;
- a network interface configured to exchange data between the agent device and a data processing system hosting the virtual assistant;
    - at least one pressure sensor configured to sense an air pressure in an environment of the agent device; and
    - at least one radar sensor configured to sense presence or movement of the user in the environment of the agent device, wherein the agent device is configured to activate the at least one radar sensor in response to the at least one pressure sensor detecting a change in air pressure in the environment of the agent device.

13. The agent device of claim 12, wherein the network interface is configured to transmit data on the air pressure or a sensed presence or movement of the user to the data processing system, wherein the network interface is further configured to receive control data indicative of a change of operation mode of the virtual assistant from the data processing system, and wherein the control data is based on the data on the air pressure and/or the sensed presence or movement of the user.

14. The agent device of claim 12, further comprising one or more of:
- a first sensor interface configured to couple to at least one external pressure sensor sensing an air pressure in an area of interest, or
- a second sensor interface configured to couple to at least one external radar sensor sensing presence or movement of the user in the area of interest.

15. A method for a virtual assistant, comprising:
- in a first operating mode,
    - activating a radar sensor upon detection of a change in air pressure from an air pressure sensor,
    - processing, using a processor, sensor data collected from the radar sensor or the air pressure sensor to detect whether the sensor data exhibit a first predetermined characteristic;
- if the first predetermined characteristic is detected in the sensor data, setting the operation mode of the virtual assistant to a second operation mode assigned to the first predetermined characteristic; and
- executing commands in response to voice commands received from a microphone in the second operating mode, but not in the first operating mode.

16. The method of claim 15, wherein the radar sensor, the air pressure sensor, the microphone and the processor are arranged in a physical agent device.

17. The method of claim 16, wherein the first predetermined characteristic indicates positioning of the agent device below a predetermined height with respect to the ground, and wherein the second operation mode is a child mode with limited functionality and/or a dedicated sound profile compared to a fully operational mode of the virtual assistant.

* * * * *